(12) United States Patent
Shimizu et al.

(10) Patent No.: US 8,423,766 B2
(45) Date of Patent: Apr. 16, 2013

(54) AUTHENTICATION METHOD, AUTHENTICATION APPARATUS, AND COMPUTER PRODUCT

(75) Inventors: Akihiro Shimizu, Kochi (JP); Takasuke Tsuji, Kochi (JP)

(73) Assignee: Trinity Security Systems, Inc., Tokyo (JP)

( * ) Notice: Subject to any disclaimer, the term of this patent is extended or adjusted under 35 U.S.C. 154(b) by 1426 days.

(21) Appl. No.: 11/368,601

(22) Filed: Mar. 7, 2006

(65) Prior Publication Data

US 2007/0050631 A1 Mar. 1, 2007

(30) Foreign Application Priority Data

Aug. 26, 2005 (JP) .................................. 2005-246506

(51) Int. Cl.
*G06F 21/00* (2006.01)
(52) U.S. Cl.
USPC .............. 713/168; 726/4; 713/182; 380/28; 380/44; 455/411; 705/67
(58) Field of Classification Search ............... 713/168, 713/182; 726/4
See application file for complete search history.

(56) References Cited

U.S. PATENT DOCUMENTS

| | | | | |
|---|---|---|---|---|
| 6,061,799 A * | 5/2000 | Eldridge et al. | ............... | 726/20 |
| 6,115,472 A * | 9/2000 | Shimizu et al. | ............... | 380/262 |
| 6,148,404 A * | 11/2000 | Yatsukawa | ............... | 726/2 |
| 6,230,269 B1 * | 5/2001 | Spies et al. | ............... | 713/182 |
| 6,434,700 B1 | 8/2002 | Alonso et al. | | |
| 6,751,733 B1 * | 6/2004 | Nakamura et al. | ............... | 713/182 |
| 6,912,653 B2 | 6/2005 | Gohl | | |
| 7,234,057 B2 * | 6/2007 | Park | ............... | 713/155 |
| 7,325,133 B2 * | 1/2008 | Fascenda | ............... | 713/168 |
| 7,607,012 B2 * | 10/2009 | Nyberg | ............... | 713/168 |
| 7,844,818 B2 * | 11/2010 | Park | ............... | 713/168 |
| 2002/0056040 A1 * | 5/2002 | Simms | ............... | 713/171 |
| 2002/0087860 A1 * | 7/2002 | William Kravitz | ............... | 713/168 |
| 2002/0091932 A1 * | 7/2002 | Shimizu et al. | ............... | 713/182 |
| 2003/0097567 A1 | 5/2003 | Terao et al. | | |

(Continued)

FOREIGN PATENT DOCUMENTS

| | | |
|---|---|---|
| TW | 228903 B | 3/2005 |
| TW | 231899 B | 5/2005 |

OTHER PUBLICATIONS

Jablon, Strong password-only authenticated key exchange, Oct. 1996, ACM SIGCOMM Computer Communication Review, vol. 26, Issue 5, pp. 5-26.*

(Continued)

*Primary Examiner* — Morshed Mehedi
(74) *Attorney, Agent, or Firm* — Foley & Lardner LLP

(57) ABSTRACT

In a server for authenticating a user, an acquiring unit acquires current authentication information that is created using an arbitrary value and that is used for a current authentication process, from user. A receiving unit receives first transmission information in which next authentication information to be used for a next authentication process is hidden using the current authentication information, and second transmission information in which the arbitrary value is hidden using the next authentication information, from the user. A calculating unit calculates the next authentication information based on the first transmission information and the current authentication information, and the arbitrary value based on calculated next authentication information and the second transmission information. A determining unit determines whether to authenticate the user based on the arbitrary value and the current authentication information.

14 Claims, 11 Drawing Sheets

U.S. PATENT DOCUMENTS

| | | | | |
|---|---|---|---|---|
| 2004/0006713 | A1* | 1/2004 | Minemura | 713/201 |
| 2005/0033957 | A1* | 2/2005 | Enokida | 713/156 |
| 2005/0100166 | A1* | 5/2005 | Smetters et al. | 380/277 |
| 2005/0216737 | A1* | 9/2005 | Hayashida et al. | 713/168 |
| 2005/0228994 | A1* | 10/2005 | Kasai et al. | 713/168 |
| 2005/0232415 | A1* | 10/2005 | Little et al. | 380/28 |
| 2006/0041759 | A1* | 2/2006 | Kaliski et al. | 713/184 |
| 2006/0080743 | A1* | 4/2006 | Zhu et al. | 726/30 |
| 2006/0126835 | A1* | 6/2006 | Kim et al. | 380/44 |
| 2006/0143453 | A1* | 6/2006 | Imamoto et al. | 713/169 |

OTHER PUBLICATIONS

Lin et al, "Security enhancement for Optimal Strong-Password Authentication protocol", Apr. 2003, ACM SIGOPS Operating Systems Review, vol. 37, Issue 2, pp. 7-12.*

Chien et al, "An Efficient and Practical Solution to Remote Authentication: Smart Card", Computers & Security, vol. 21, Issue 4, Aug. 1, 2002, pp. 372-375.*

T. Tsuji et al., "Simple and Secure Password Authentication Protocol, Ver. 2 (SAS-2)," The Institute of Electronics, Information and Communication Engineers, Technical Report of IEICE, 01S2002-30, IE2002-64 (Sep. 2002), pp. 7-11.

Chih-Wei Lin et al., Security Enhancement for Optimal Strong-Password Authentication Protocol, ACM SIGOPS Operating Systems Review, Apr. 2003, vol. 37, No. 2, pp. 7-12.

Ya-Fen Chang et al., A Secure and Efficient Strong-Password Authentication Protocol, ACM SIGOPS Operating Systems Review, Jul. 2004, vol. 38, No. 3, pp. 79-90.

* cited by examiner

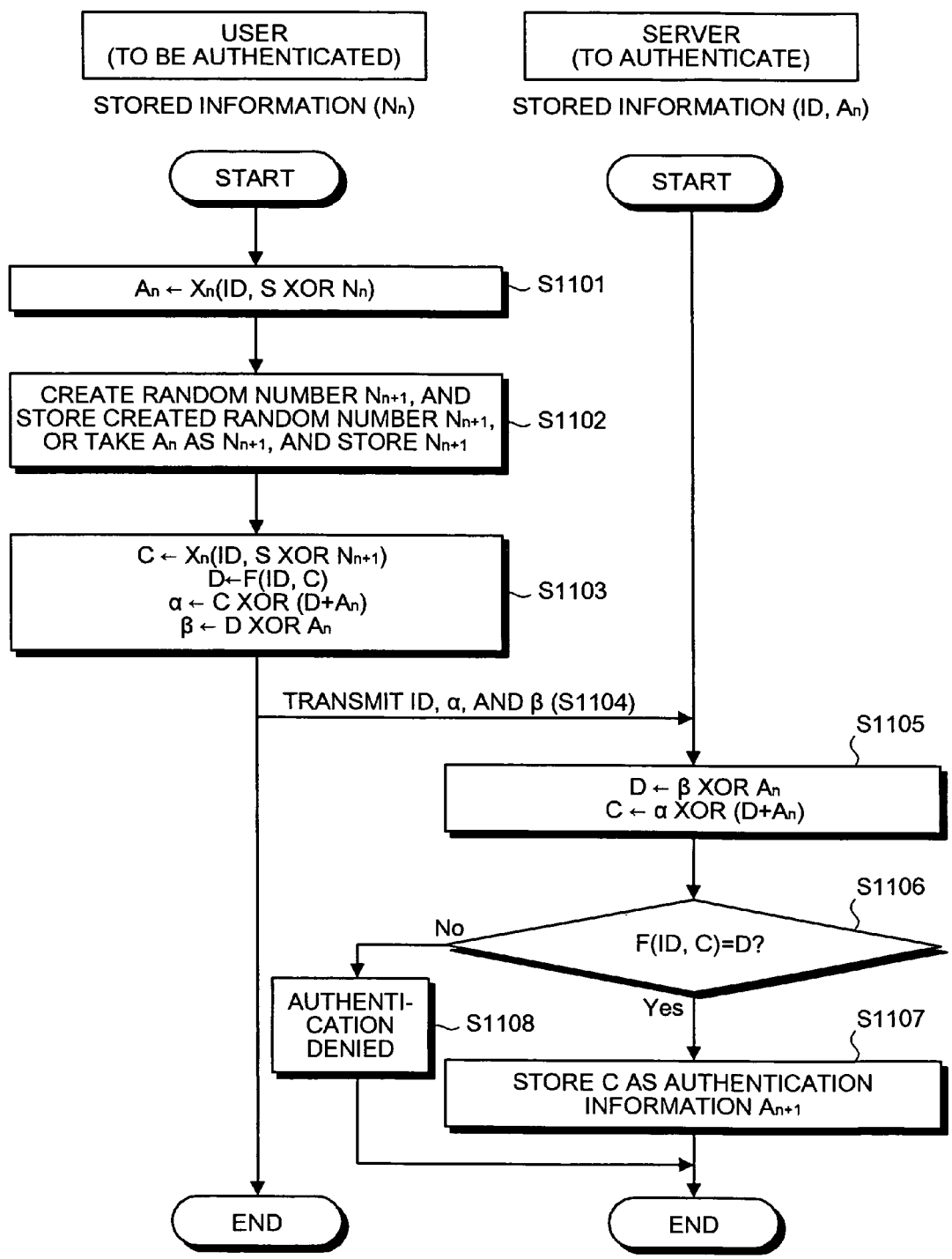

AUTHENTICATION METHOD, AUTHENTICATION APPARATUS, AND COMPUTER PRODUCT

CROSS-REFERENCE TO RELATED APPLICATIONS

This application claims priority from Japanese Patent Application JP 2005-246506, filed Aug. 26, 2005, incorporated herein by reference in its entirety.

BACKGROUND OF THE INVENTION

1. Field of the Invention

The present invention relates to a technology for an authentication processing for authenticating a communication party or a user in an information communication system.

2. Description of the Related Art

Conventionally, when an authenticator (server) authenticates a party to be authenticated (user), a password authentication method is widely used, in which the server requests the user to input a password, and authenticate the user with a validity of the input password. In addition, to secure a safety, a one-time password method in which a password valid for only one authentication is used, or an authentication method in which authentication information created from a password is used instead of the password itself is used.

A simple and secure password authentication protocol Ver. 2 (SAS-2) authentication method is an example of the password authentication method in which a server authenticates a user based on following procedures (see, for example, Information and Communication Engineers, OIS2002-30, Vol. 102, No. 314, pp. 7-11, 2002, The Institute of Electronics, "Simple and secure password authentication protocol, Ver. 2 (SAS-2)" by Takasuke Tsuji, et. al.). FIG. 10 and FIG. 11 are flowcharts of a processing procedure for a user authentication in the SAS-2 authentication method.

In the following explanation, "←" indicates a substitution to a left-hand side by a right-hand side, "S" represents a password that is privately held by a user, "ID" represents an identifier for a user, "XOR" represents an exclusive-OR operator, "n" is the number of authentication, and "$N_n$" is a random number (n is a positive integer equal to or greater than "1", and is used for specifying the random number). In addition, "F" and "H" represent one-way functions that do not use the password S, "X" is a one-way function that uses the password S and the random number $N_n$, and $X_n = X(ID, S \text{ XOR } N_n)$.

Initially, a user makes a registration in a server from which the user wants to get an authentication (hereinafter, the operation of the registration is referred to as "an initial registration"). FIG. 10 is a flowchart of the initial registration of a user, according to the conventional technology. The user possesses a user identifier ID and a password S in advance.

The user creates a random number $N_1$ and stores the created random number $N_1$ (step S1001). The user calculates initial authentication information $A_1$ defined by Equation 1 using the random number $N_1$, the password S that is held privately, and the user identifier ID (step S1002), and transmits the authentication information $A_1$ with the user identifier ID via a safe means (step S1003). The safe means includes a dedicated line for the authentication information, and a mailing of a recording medium in which the authentication information is stored. The authentication information $A_1$ is authentication information used for the first time (n=1) authentication.

$$A_1 \leftarrow X_1(ID, S \text{ XOR } N_1) \quad (1)$$

The server stores the authentication information $A_1$ in association with the user identifier ID, which is transmitted at step S1003 (step S1004). In this manner, the initial registration of the user is completed.

FIG. 11 is a flowchart of an $n_{th}$ time authentication after the first time (n=1) authentication, according to the conventional technology. At this moment, the user possesses ID, S, and $N_n$, and the server holds ID and $A_n$ (at the time of the first time authentication, n=1). The user calculates $A_n$ defined by Equation 2, from the stored random number $N_n$ (step S1101).

$$A_n \leftarrow X_n(ID, S \text{ XOR } N_n) \quad (2)$$

Then, the user creates a new random number Nn+1 and stores the created random number Nn+1, or takes An as Nn+1 and stores Nn+1 (step S1102). Subsequently, C and D defined by Equations 3 and 4, respectively, are calculated using Nn+1, and α, AND β defined by Equations 5 and 6, respectively, are calculated using C, D, and An (step S1103).

$$C \leftarrow X_n(ID, S \text{ XOR } N_{n+1}) \quad (3)$$

$$D \leftarrow F(ID, C) \quad (4)$$

$$\alpha \leftarrow C \text{ XOR } (D+A_n) \quad (5)$$

$$\beta \leftarrow D \text{ XOR } A_n \quad (6)$$

Finally, the user transmits calculated α AND β together with ID to the server (step S1104). At this time, $A_n$ is current authentication information used for a current authentication process, C is next authentication information to be used for a next authentication process, and D is another next authentication information obtained by unidirectional conversion of the next authentication information C.

Upon receiving α AND β from the user, the server calculates D defined by Equation 7 using the current authentication information An that is registered corresponding to ID, and calculates C defined by Equation 8 using calculated D and the current authentication information, with respect to received α AND β (step S1105).

$$D \leftarrow \beta \text{ XOR } A_n \quad (7)$$

$$C \leftarrow \alpha \text{ XOR } (D+A_n) \quad (8)$$

Thereafter, the server carries out a unidirectional conversion of C calculated from Equation 8 with ID, and verifies if a result of the unidirectional conversion is identical to D (F(ID, C)=D?) (step S1106). If the result of the unidirectional conversion is identical to D ("YES" at step S1106), the server authenticates the user (authentication complete), and stores the next authentication information C as authentication information to be used for the next $((n+1)_{th})$ authentication (step S1107).

On the other hand, if the result of the unidirectional conversion is not identical to D ("NO" at step S1106), the server denies the authentication of the user (step S1108), and ends the process of the flowchart. By carrying out the above process, the server determines whether to authenticate a user who calls for an authentication.

According to the above conventional technology, the authentication process is carried out based on transmission information that is mask-processed using the current authentication information A that is registered in the server. Therefore, it is possible to create the transmission information with ease by stealing the current authentication information stored in the server, and as a result, a malice third party can carry out an illegal authentication.

In particular, a server installed in a public place or a server installed by a person who does not have enough knowledge of a security is apt to be a target of a malice, and the current authentication information can be easily stolen. In addition, when there is a malice on the server side, the malice can take on the position of a legal user to be authenticated by using the current authentication information stored in the server.

Furthermore, if the malice can succeed to obtain an illegal authentication by taking on the position of the legal user, private information can be leak, or information of the legal user can be illegally modified. Once information is disclosed, it cannot be returned to a private state, resulting in a serious damage to both the authenticator and the user.

SUMMARY OF THE INVENTION

It is an object of the present invention to at least solve the above problems in the conventional technology.

A method of authenticating a subject device to be authenticated according to one aspect of the present invention includes acquiring current authentication information that is created using an arbitrary value, and that is used for a current authentication process, from the subject device; receiving first transmission information in which next authentication information to be used for a next authentication process is hidden using the current authentication information, and second transmission information in which the arbitrary value is hidden using the next authentication information, from the subject device; calculating the next authentication information based on the first transmission information and the current authentication information; calculating the arbitrary value based on calculated next authentication information and the second transmission information; and determining whether to authenticate the subject device based on calculated arbitrary value and the current authentication information.

A method of requesting an authentication to an authenticating apparatus from a subject device to be authenticated according to another aspect of the present invention includes creating current authentication information that is used for a current authentication process, using an arbitrary value; delivering the current authentication information to the authenticating apparatus; creating first transmission information in which next authentication information to be used for a next authentication process is hidden using the current authentication information; creating second transmission information in which the arbitrary value is hidden using the next authentication information; and transmitting the first transmission information and the second transmission information to the authentication apparatus.

A computer-readable recording medium according to still another aspect of the present invention stores therein a computer program according to the above aspects.

An authentication apparatus according to still another aspect of the present invention includes a first acquiring unit configured to acquire, from a subject device to be authenticated, current authentication information that is created using an arbitrary value and that is used for a current authentication process; a receiving unit configured to receive first transmission information in which next authentication information to be used for a next authentication process is hidden using the current authentication information, and second transmission information in which the arbitrary value is hidden using the next authentication information, from the subject device; a first calculating unit configured to calculate the next authentication information based on the first transmission information and the current authentication information; a second calculating unit configured to calculate the arbitrary value based on calculated next authentication information and the second transmission information; and a determining unit configured to determine whether to authenticate the subject device based on calculated arbitrary value and the current authentication information.

An authentication apparatus according to still another aspect of the present invention includes a first creating unit configured to create current authentication information that is used for a current authentication process, using an arbitrary value; a delivering unit configured to deliver the current authentication information to the authenticating apparatus; a second creating unit configured to create first transmission information in which next authentication information to be used for a next authentication process is hidden using the current authentication information; a third creating unit configured to create second transmission information in which the arbitrary value is hidden using the next authentication information; and a transmitting unit configured to transmit the first transmission information and the second transmission information to the authentication apparatus.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 is a flowchart of an $n_{th}$ time authentication after the first time (n=1) authentication in the SAS-2 authentication method.

DETAILED DESCRIPTION OF THE PREFERRED EMBODIMENTS

Exemplary embodiments according to the present invention will be explained in detail below with reference to the accompanying drawings.

A system configuration of an authentication processing system according to the embodiments will be explained with reference to FIG. 1. In a first embodiment to a third embodiment of the present invention, the system configuration of the authentication processing system, hardware configuration, and functional configuration (corresponding to FIG. 1 to FIG. 3) are common.

Figure 1:
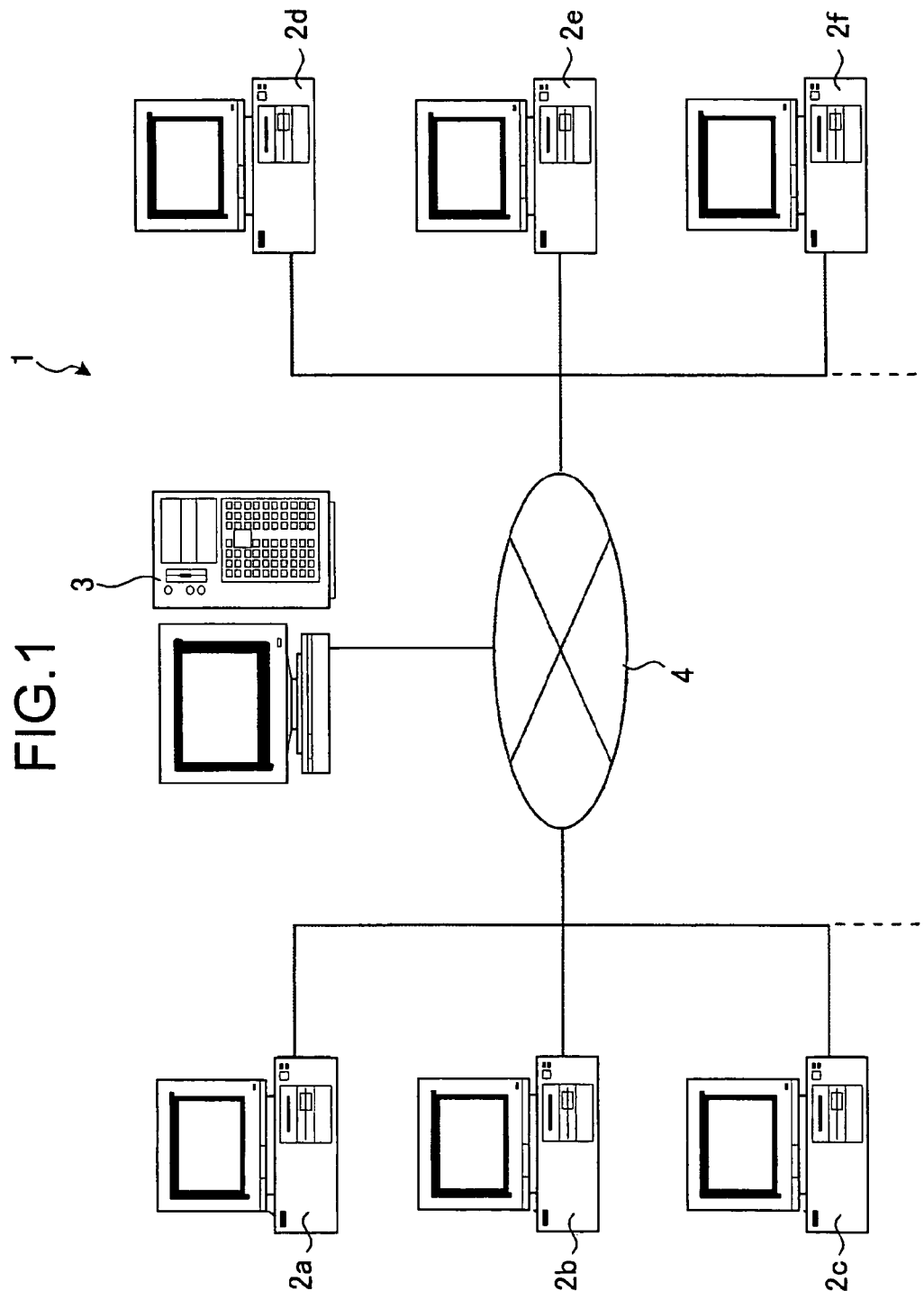
FIG. 1 is a schematic of an authentication processing system according to embodiments of the present invention.

FIG. 1 is a schematic diagram for illustrating a system configuration of an authentication processing system 1 according to the present invention. The authentication processing system 1 is configured with a user 2 (2a to 2f) and a server 3. In the authentication processing system 1, the user 2 is an apparatus to be authenticated that makes a request for an authentication to an authenticating apparatus, and the server 3 is the authenticating apparatus that authenticates the apparatus to be authenticated. The user 2a to 2f and the server 3 are connected via a network 4.

The user 2 makes a request for an authentication to the server 3, and receives a predetermined service (such as a data communication connection service, a gate pass permission, and a contents providing) that is provided by the server 3. The server 3 carries out an authentication process for the user 2, and when the user 2 is authenticated, provides the predetermined service to the user 2. Hereinafter, when the server 3 authenticated the user 2 (when an authentication is completed), it is assumed that an interconnection between the server 3 and the user 2 is started. In addition, although a detailed explanation is not given, the user 2 can also carry out an inter-authentication to authenticate the server 3 to which the user makes a request for an authentication.

Figure 2:
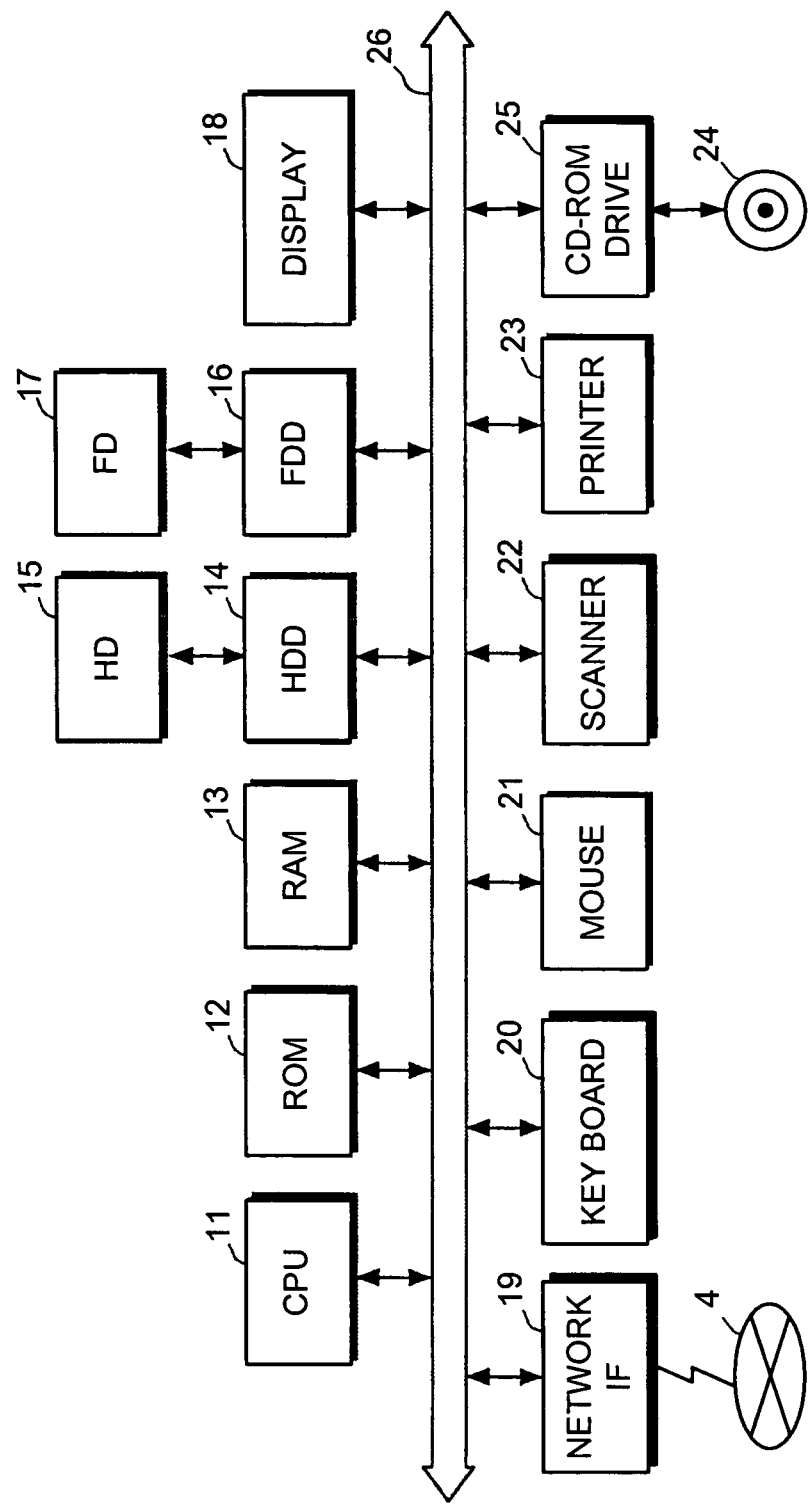
FIG. 2 is a block diagram of a hardware configuration of the authentication processing system.

FIG. 2 is a block diagram for illustrating an example of a hardware configuration of the user 2 and the server 3 constituting the authentication processing system 1. Hereinafter, for the sake of convenience in explanation, it is assumed that the user 2 and the server 3 has the same hardware configuration, and an object that implements each of functions of the user 2 and the server 3 is referred to as "an apparatus".

A central processing unit (CPU) 11 controls the entire apparatus, a read only memory (ROM) 12 stores a basic input-output program, and a random access memory (RAM) 13 is used as a working area of the CPU 11.

A hard disk drive (HDD) 14 controls a read/write of data with respect to a hard disk (HD) 15 according to a control of the CPU 11, and the HD 15 stores data written by a control of the HDD 14. A flexible disk drive (FDD) 16 controls a read/write of data with respect to a flexible disk (FD) 17 according to a control of the CPU 11, and the FD 17 stores data written by a control of the FDD 16.

A display 18 displays a variety of data, such as a cursor, a menu, a window, a text, and an image. A network interface (IF) 19 carries out a reception and a transmission of data with respect to the network 4. A keyboard 20 includes a plurality of keys for inputting a text, a numerical value, and a variety of instructions, and a mouse 21 carries out selection and execution of a variety of instructions, selection of an object to be processed, and movement of the cursor.

A scanner 22 optically reads a text or an image, a printer 23 prints out a text or an image on a paper or the like, a compact disk-read only memory (CD-ROM) 24 is a removable recording medium, a CD-ROM drive 25 controls a read/write of data with respect to the CD-ROM 24, and a bus (or a cable) 26 connects the above components.

Figure 3:
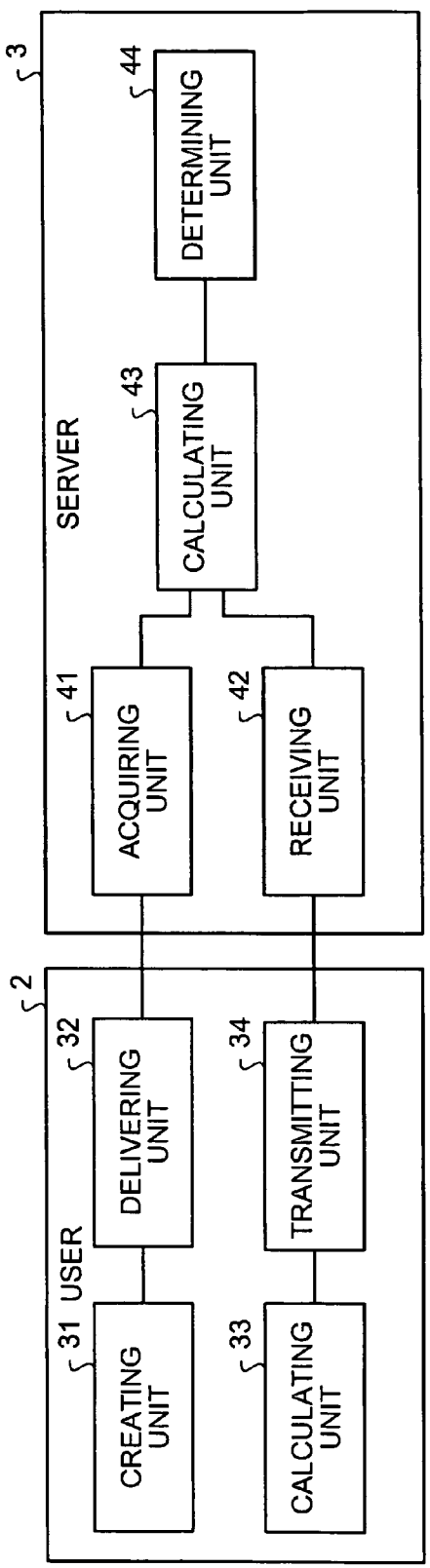
FIG. 3 is a block diagram of a functional configuration of the authentication processing system.

FIG. 3 is a block diagram for illustrating a functional configuration of the user and the server constituting the authentication processing system.

The user 2 includes a creating unit 31, a delivering unit 32, a calculating unit 33, and a transmitting unit 34. The creating unit 31 creates current authentication information (A) that is used for a current authentication process, using an arbitrary value (a). The creating unit 31 creates the current authentication information by carrying out an using a one-way function with which a calculation of a value before the operation is difficult for the arbitrary value. In addition, the creating unit 31 creates an authentication key (K) that is unique to the user 2, together with the current authentication information.

The one-way function is a function with which, when two values (x and y) are operated using the function, even if a value (z) of a result of the operation and one of the two values (for example, x) are known, it is difficult to calculate the other value (y). In other words, when the one-way function is h, a value z obtained by operating the values x and y using the one-way function h is expressed as $z=h(x, y)$. At this time, it is difficult to calculate y from x and z.

The delivering unit 32 delivers the current authentication information created by the creating unit 31 to the server 3. In addition, the delivering unit 32 delivers the authentication key to the server 3 together with the current authentication information. The delivering of the current information and the authentication key means sending information to the server 3 using a method that is not available to a third party other than the server 3, such as a transmission via a dedicated line for the information, and a mailing of a recording medium in which the information is stored.

The calculating unit 33 calculates next authentication information (B) that is used for a next authentication process, and calculates first transmission information, in which next authentication information to be used for a next authentication process is hidden using the current authentication information, and second transmission information, in which arbitrary value is hidden using the next authentication information. The calculating unit 33 calculates a value by carrying out an operation using a mask function with which a calculation of a value before the operation is easy for the next authentication information and the current authentication information, as the first transmission information, and a value by carrying out the operation using the mask function for the next authentication information (or sum of the next authentication information and the authentication key) and the arbitrary value, as the second transmission information.

The mask function is a function with which, when the operation is carried out twice, a result of the operation becomes the original value, such as an exclusive OR (XOR). Hereinafter, the mask function is taken as the exclusive-OR operation.

The transmitting unit 34 transmits the first transmission information and the second transmission information calculated by the calculating unit 33 to the server 3. The transmitting unit 34 transmits the above transmission information to the server 3 via the network 4.

The server 3 includes an acquiring unit 41, a receiving unit 42, a calculating unit 43, and a determining unit 44. The acquiring unit 41 acquires the current authentication information delivered by the delivering unit 32 of the user 2 and the authentication key unique to the user 2. The receiving unit 42 receives the first transmission information and the second transmission information transmitted by the transmitting unit 34 of the user 2.

The calculating unit 43 calculates the next authentication information using the first transmission information received by the receiving unit 42 and the current authentication information acquired by the acquiring unit 41, and calculates the arbitrary value using the next authentication information and the second transmission information. The calculating unit 43 calculates the next authentication information (or sum of the next authentication information and the authentication key) by carrying out the exclusive-OR operation with respect to the first transmission information and the current authentication information, and calculates the arbitrary value by carrying out the exclusive-OR operation with respect to the next authentication information (or sum of the next authentication information and the authentication key) and the second transmission information.

The determining unit 44 determines whether to authenticate the user 2, based on the arbitrary value calculated by the calculating unit 43 and the current authentication information acquired by the acquiring unit 41. The determining unit 44 determines whether a value obtained by carrying out the operation using the one-way function for the arbitrary value is identical to the current authentication information. When the value obtained by carrying out the operation using the one-way function for the arbitrary value is identical to the current authentication information, the server 3 authenticates the user 2, otherwise denies the authentication of the user 2.

Each of the above components is implemented by executing a command process by the CPU 11 according to a command of a program that is loaded to the RAM 13 from a variety of recording media, such as the HD 15, the FD 17, and the CD-ROM 24 of each of the apparatuses.

Following is an explanation for a process when the server 3 (authenticating apparatus) authenticates the user 2 (apparatus to be authenticated). Prior to the authentication process, an initial registration process of the user 2 is carried out with respect to the server 3. The server 3 carries out the authentication process to authenticate the user 2 using information registered at the time of the initial registration.

In the following explanation, "←" indicates a substitution of a left-hand side by a right-hand side, "S" means a password that is privately held by the user (apparatus to be authenticated), "ID" is a user identifier, "XOR" is the exclusive-OR operator, "n" is the number of authentication, and "$N_n$" is a random number (n is a positive integer equal to or greater than "1", and is used for specifying the random number), F is a one-way function that does not use the password S. When z=F(x, y), it is difficult to quantitatively calculate y from z and x. "X" is a one-way function that uses the password S and the random number $N_n$, and $X_n$=X(ID, S, $N_n$).

Figure 4:
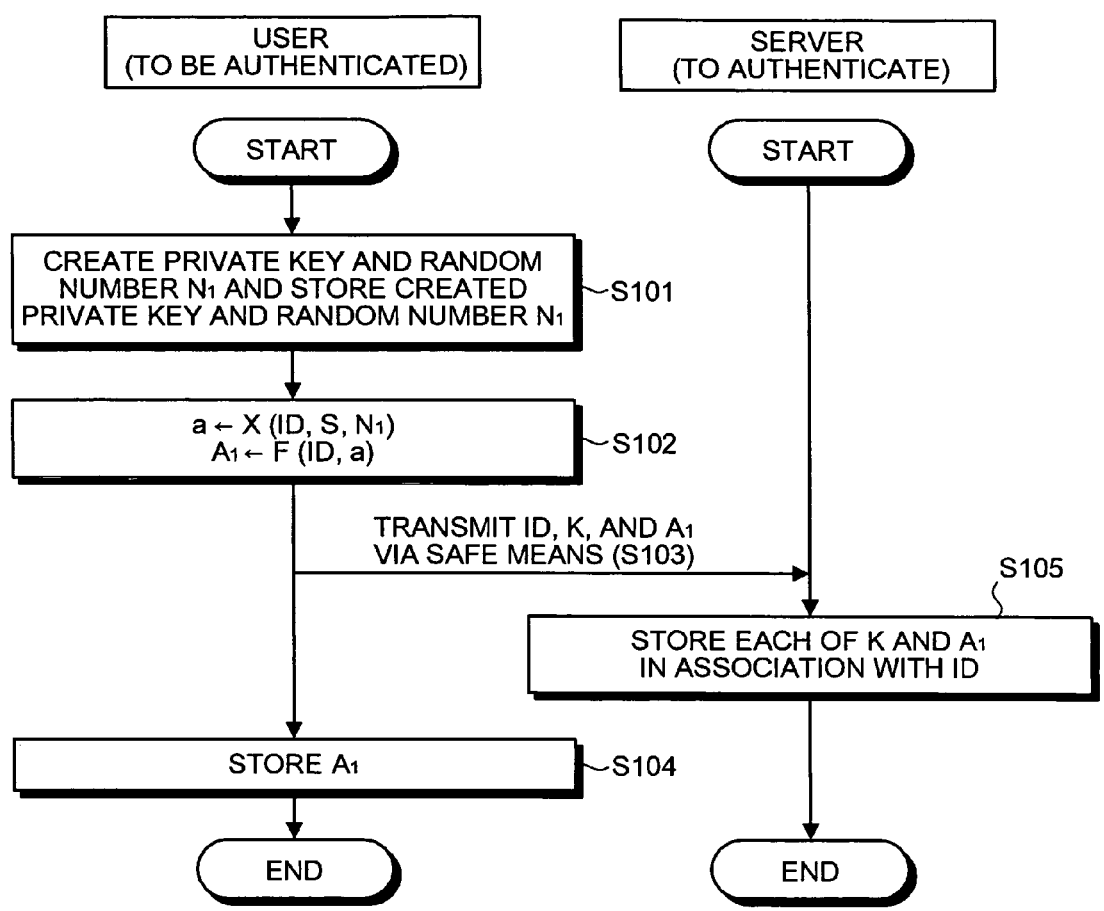
FIG. 4 is a flowchart of an initial registration of a user, according to a first embodiment of the present invention.

FIG. 4 is a flowchart of a processing procedure for an initial registration of the user, according to a first embodiment of the present invention. The user 2 possesses the user identifier ID for identifying itself from among a plurality of the users 2. In addition, the user 2 holds the password S that is private to itself. The user identifier ID and the password S can be registered in the user 2, or can be requested in each case of process.

Firstly, the user 2 creates a private key K and a random number $N_1$, and stores created private key K and random number $N_1$ (step S101). Then, the user 2 calculates $A_1$ following Equations 9 and 10, using the user identifier ID, the password S, and the random number $N_1$. The $A_1$ in Equation 9 is authentication information $A_n$ that is used for the first time (n=1) authentication. Hereinafter, the $A_1$ is referred to as first-time authentication information.

$$a \leftarrow X(ID, S, N_1) \quad (9)$$

$$A_1 \leftarrow F(ID, a) \quad (10)$$

The user 2 transmits the user identifier ID, the private key K, and the first-time authentication information $A_1$ via a safe means (step S103). The safe means includes a transmission through a dedicated line for the information and a mailing of a recording medium in which the information is stored. Then, the user 2 stores the calculated first-time authentication information $A_1$ (step S104), and ends the process of the flowchart.

The server 3 stores each of the private key K and the first-time authentication information $A_1$ transmitted from the user 2 in association with the user identifier ID (step S105), and ends the process of the flowchart.

Figure 5:
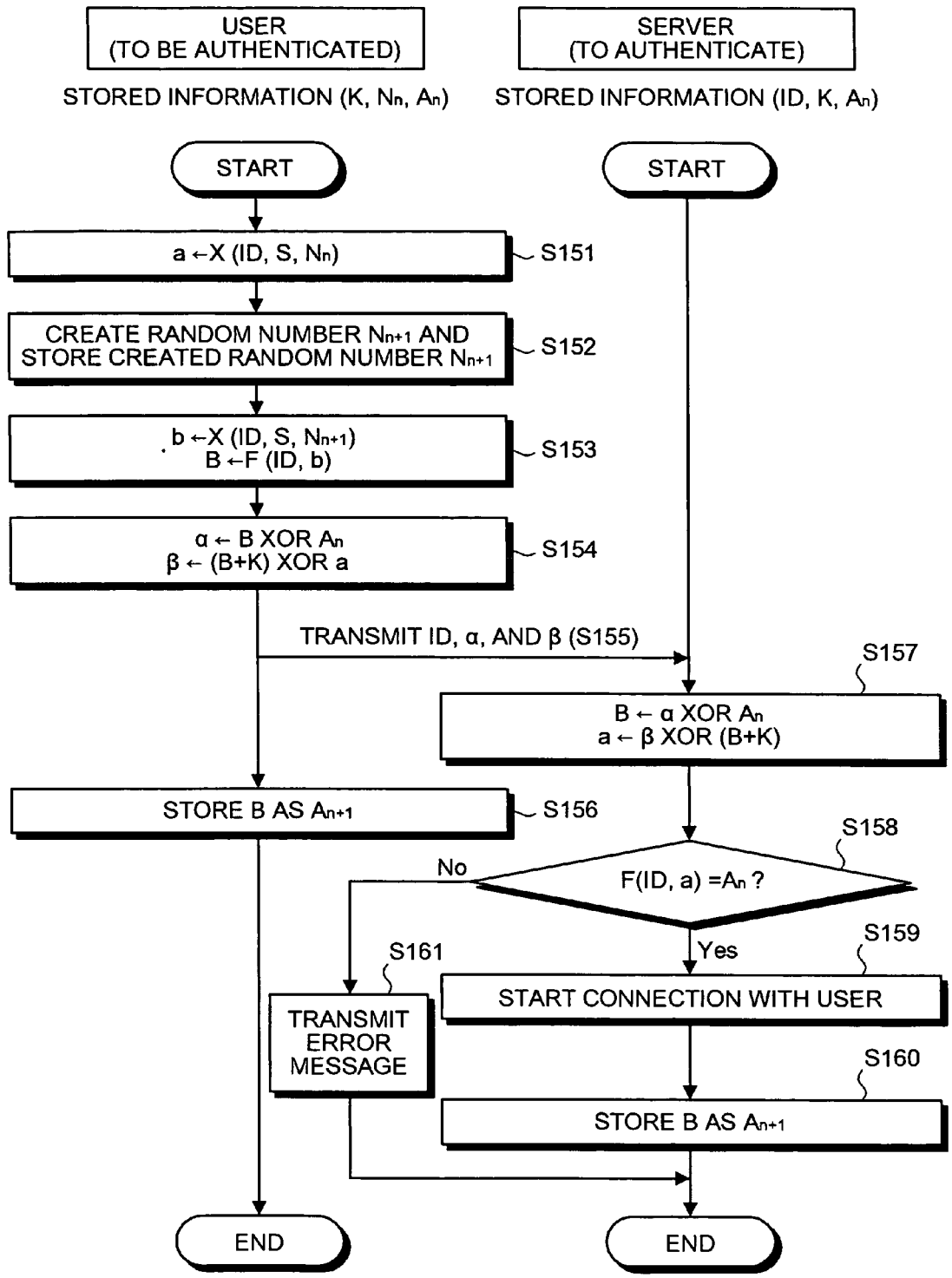
FIG. 5 is a flowchart of an $n_{th}$ time authentication after a first time (n=1) authentication, according to the first embodiment.

FIG. 5 is a flowchart of a processing procedure for an $n_{th}$ time authentication after the first time (n=1) authentication, according to the first embodiment. At this moment, the user 2 possesses the private key K, the random number $N_n$ (at the time of the first time authentication, n=1), and the authentication information $A_n$ (at the time of the first time authentication, n=1), as stored information. The server 3 possesses ID of the user 2, the private key K and the authentication information $A_n$ (at the time of the first time authentication, n=1) transmitted from the user 2 at the time of initial registration in FIG. 4, as stored information.

The user 2 calculates a defined by Equation 11 from stored $N_n$ (step S151). Then, the user 2 creates a new random number $N_{n+1}$, stores the created random number (step S152), and calculates B defined by Equation 13 following Equations 11 and 12 (step S153).

$$a \leftarrow X(ID, S, N_n) \quad (11)$$

$$b \leftarrow X(ID, S, N_{n+1}) \quad (12)$$

$$B \leftarrow F(ID, b) \quad (13)$$

The user 2 calculates α and β defined by Equations 14 and 15, respectively, using the calculated a and B, and the stored K and $A_n$ (step S154), and transmits ID, α, and β to the server 3 (step S155). Then, the user 2 stores B calculated at step S153 as next authentication information $A_{n+1}$ (step S156), and ends the process of the flowchart. Here, a is data that becomes a source of the authentication information $A_n$.

$$\alpha \leftarrow B \text{ XOR } A_n \quad (14)$$

$$\beta \leftarrow (B+K) \text{ XOR } a \quad (15)$$

The server 3 calculates B defined by Equation 16 using the authentication information $A_n$ that is registered in association with ID of the user 2 (step S157), and calculates a defined by Equation 17 using a sum of B and K, with respect to α and β received from the user 2.

$$B \leftarrow \alpha \text{ XOR } A_n \quad (16)$$

$$a \leftarrow \beta \text{ XOR } (B+K) \quad (17)$$

The server 3 determines whether a result of the unidirectional conversion of the calculated a and the stored ID, F(ID, a) is identical to $A_n$ (step S158). When F(ID, a) is identical to $A_n$ ("YES" at step S158), the server 3 authenticates the user 2, and starts a connection with the user 2 (step S159). In addition, the server 3 stores B as the next authentication information ($A_{n+1}$) to be used for the next authentication (step S160), and ends the process of the flowchart. On the other hand, when F(ID, a) is not identical to $A_n$ ("NO" at step S158), the server denies the authentication of the user 2, transmits an error message to the user 2 (step S161), and ends the process of the flowchart.

The method of calculating α and β at step S154 is not limited to the above Equations 14 and 15. In the calculation shown in Equations 14 and 15, a sum of B and K is used for calculating β. However, this process is to prevent, when α and β are acquired by a third party during a transmission of α and β to the server 3, an attack by the third party using the acquired values. In other words, by performing an operation on either one of B that is used for calculating α and B that is used for calculating β, so that the B portion (the value that is exclusive-OR operated with $A_n$ or a) of α and the B portion of β are different, B cannot be calculated from α and β. The method of calculating α and β can be any one, not being limited to above Equations 14 and 15, as long as it satisfies the above condition.

For example, it is possible to use a value created from common information between the user 2 and the server 3, such as ID, or common information such as $A_n$ as K. In the above example, K is a value calculated as the private key at step S101, however, α and β can be calculated as following Equations 18 and 19 by using the user identifier ID.

$$\alpha \leftarrow B \text{ XOR } An \quad (18)$$

$$\beta \leftarrow (B+\text{ID}) \text{ XOR } a \quad (19)$$

Furthermore, when calculating β, a subtraction of K from B can be used instead of an addition of K to B, as shown in following Equations 20 and 21. In addition, it is possible to use any kind of operation between B and K, such as a multiplication and a division.

$$\alpha \leftarrow B \text{ XOR } An \quad (20)$$

$$\beta \leftarrow (B-K) \text{ XOR } a \quad (21)$$

Moreover, when calculating α, an operation using K can also be used. For example, an addition of K to B can be used for calculating α, as shown in following Equations 22 and 23. However, an operation to B in calculating α should be the one for which an inverse operation is possible, such as B–K.

$$\alpha \leftarrow (B+K) \text{ XOR } An \quad (22)$$

$$\beta \leftarrow B \text{ XOR } a \quad (23)$$

In addition to the above methods of calculation, a combination of operations can be used for calculating α and β, as shown in following Equations 24 and 25.

$$\alpha \leftarrow (B-\text{ID}) \text{ XOR } An \quad (24)$$

$$\beta \leftarrow B \text{ XOR } a \quad (25)$$

In this manner, there are various methods of calculating α and β, however, a method of calculating a at step S157 depends on the method of calculating α and β. For example, when α and β are calculated using the above Equations 18 and 19, a can be calculated using operations shown in following Equations 26 and 27.

$$B \leftarrow \alpha \text{ XOR } An \quad (26)$$

$$a \leftarrow \alpha \text{ XOR } (B+\text{ID}) \quad (27)$$

As described above, according to the first embodiment, the authentication information for an authentication process can only be created using data (password S and random number $N_n$) that become sources of the authentication information that is exclusively stored in the apparatus to be authenticated (user 2). Therefore, even if information regarding the apparatus to be authenticated (ID, K, $A_n$), which is stored in the authenticating apparatus (server 3) is stolen by a third party, the third party cannot create the authentication information for the authentication process, and cannot obtain an authentication by the authenticating apparatus.

According to the first embodiment, a countermeasure is taken against a stealing of information on an apparatus to be authenticated (user 2) from an authenticating apparatus (server 3), by creating authentication information to be used for an authenticating process from data that is stored in the apparatus to be authenticated only. According to a second embodiment of the present invention, it is confirmed whether information that becomes a source of current authentication information ($A_n$) that is used for a current ($n_{th}$) authentication is calculated from information that is encrypted using next authentication information ($A_{n+1}$:B) that is used for a next (($n+1)_{th}$) authentication. With this mechanism, it is possible to detect a modification of delivering information by a third party.

Figure 6:
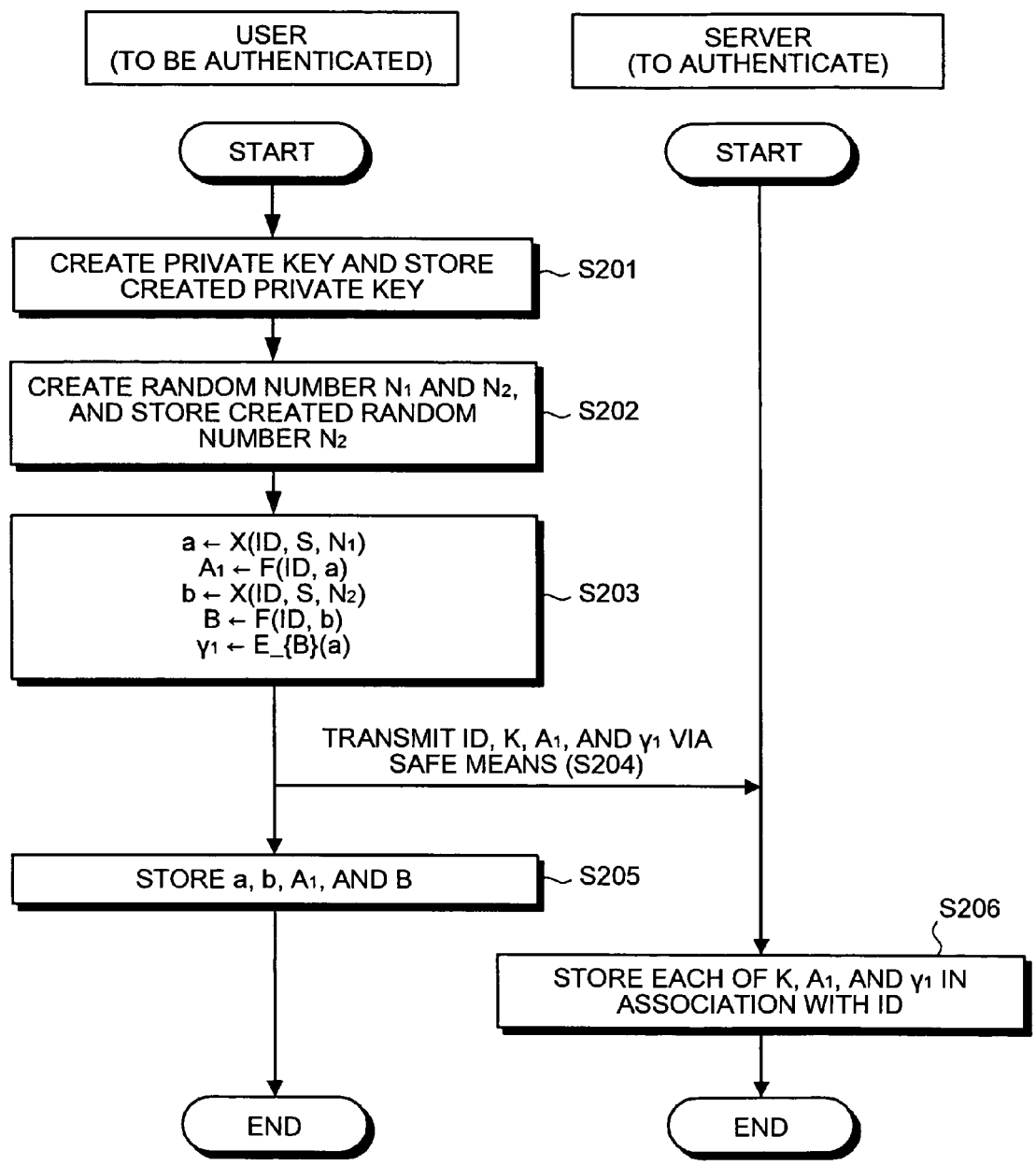
FIG. 6 is a flowchart of an initial registration of a user, according to a second embodiment of the present invention.

FIG. 6 is a flowchart of a processing procedure for an initial registration of a user, according to the second embodiment. The user 2 possesses a user identifier ID for identifying itself from a plurality of users 2. In addition, the user 2 possesses a private password S that is known to itself only.

Firstly, the user 2 creates a private key K, and stores K (step S201). Then, the user 2 creates random numbers $N_1$ and $N_2$, and stores $N_2$ (step S202). The user 2 calculates A1 from following Equations 28 and 29, and calculates γ1 from following Equations 30 to 32, using the user identifier ID, the password S, and the random numbers $N_1$ and $N_2$ (step S203). The A1 and γ1 are first-time authentication information that are used for a first time (n=1) authentication. The right-hand side of Equation 32 E_{B}(a) is a value obtained by encrypting a by using B as a key.

$$a \leftarrow X(\text{ID}, S, N_1) \quad (28)$$

$$A_1 \leftarrow F(\text{ID}, a) \quad (29)$$

$$b \leftarrow X(\text{ID}, S, N_2) \quad (30)$$

$$B \leftarrow F(\text{ID}, b) \quad (31)$$

$$\gamma_1 \leftarrow E\_\{B\}(a) \quad (32)$$

The user 2 transmits the user identifier ID, the private key K, and the first-time authentication information A1 and γ1 via a safe means (step S204). Then, the user 2 stores the calculated a and b (hereinafter, "authenticator a and b"), $A_1$, and B (step S205), and ends the process of the flowchart.

The server 3 stores each of the private key K and the first-time authentication information A1 and γ1 transmitted from the user 2 in association with the user identifier ID (step S206), and ends the process of the flowchart. With the above process, the user 2 is initially registered in the server 3.

Figure 7:
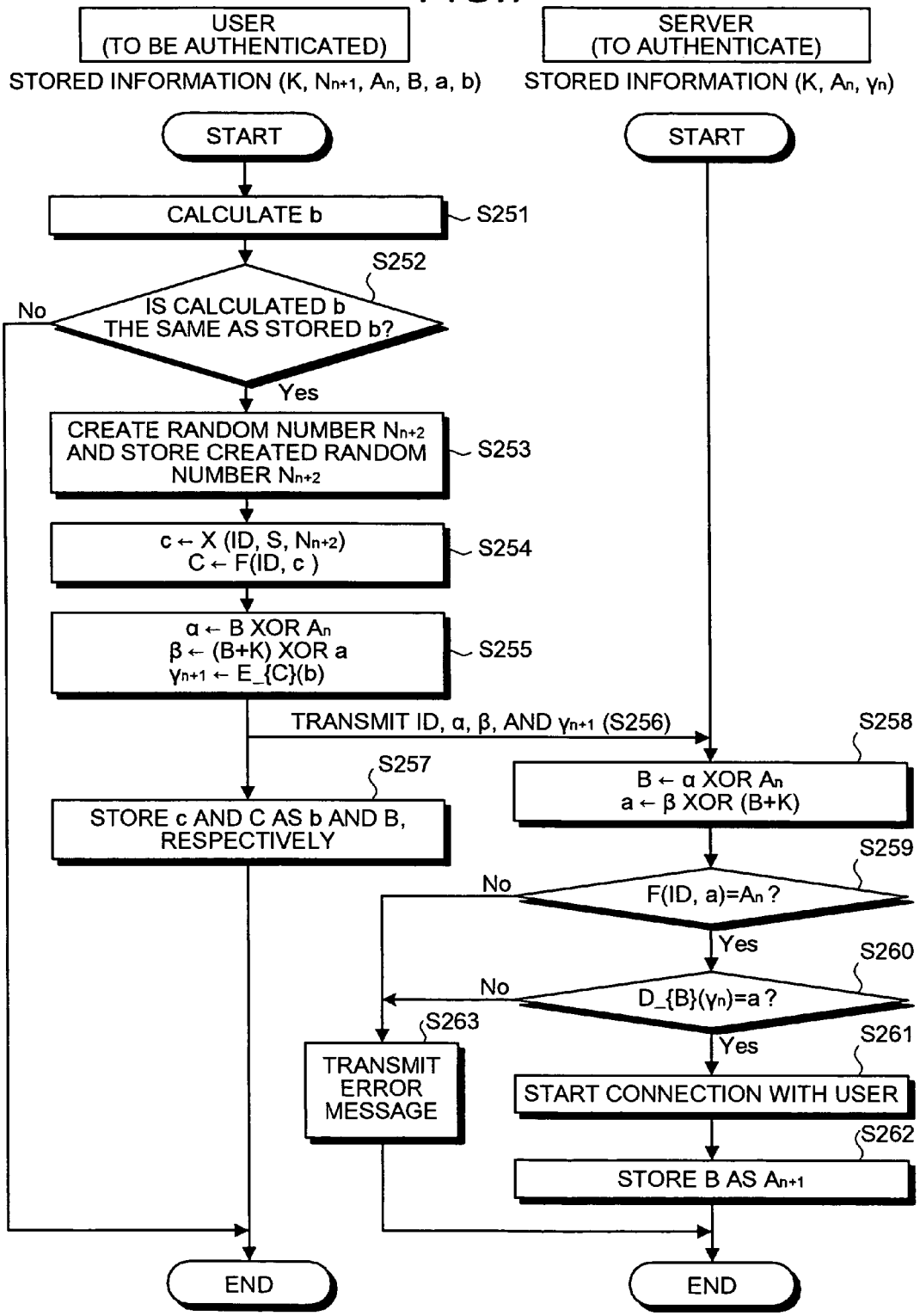
FIG. 7 is a flowchart of an $n_{th}$ time authentication after the first time (n=1) authentication, according to the second embodiment.

FIG. 7 is a flowchart of a processing procedure for an $n_{th}$ time authentication after the first time (n=1) authentication, according to the second embodiment. At this moment, the user 2 possesses the private key K, the random number $N_{n+1}$ (at the time of the first time authentication, $N_2$ because n=1), the authentication information $A_n$ (at the time of the first time authentication, n=1), B, and the authenticator a and b, as stored information. The server 3 possesses the private key K, and the authentication information $A_n$ and $\gamma_n$ (at the time of the first time authentication, n=1) transmitted from the user 2 at the time of initial registration in FIG. 6, as stored information.

The user 2 calculates b defined by Equation 33 from stored $N_{n+1}$ (step S251), and determines whether the calculated b is identical to the stored b (step S252). At this time, ID and S that are used for calculating b can be requested to the user 2 for every authentication process, and can be stored in the user 2. When the calculated b is identical to the stored b ("YES" at step S252), the user 2 goes to step S253. On the other hand, when the calculated b is not identical to the stored b ("NO" at step S252), the user 2 ends the process of the flowchart.

$$b \leftarrow X(\text{ID}, S, N_{n+1}) \quad (33)$$

The user 2 creates a new random number $N_{n+2}$, stores $N_{n+2}$ (step S253), and calculates an authenticator c and authentication information C from following Equations 34 and 35 (step S254). The authenticator c and the authentication information C are the information after the next authentication information for an authentication after the next authentication.

$$c \leftarrow X(\text{ID}, S, N_{n+2}) \quad (34)$$

$$C \leftarrow F(\text{ID}, c) \quad (35)$$

Subsequently, the user 2 calculates α, β, and γn+1 defined by following Equations 36 to 38, respectively, using the calculated b and D, and the stored K, $A_n$, and B (step S255). Then, the user 2 transmits ID, α, β, and γn+1 to the server 3 (step S256). In addition, the user 2 stores the calculated c and C as the next authenticator b and the next authentication information B (step S257), and ends the process of the flowchart. As for the method of calculating α and β, although there are various methods as described in the first embodiment, operations shown in following Equations 36 and 37 are used as an example.

$$\alpha \leftarrow B \text{ XOR } An \qquad (36)$$

$$\beta \leftarrow (B+K) \text{ XOR } a \qquad (37)$$

$$\gamma_{n+1} \leftarrow E\_\{C\}(b) \qquad (38)$$

The server 3 calculates a from following Equations 39 and 40 using the authentication information $A_n$ and the private key K that are stored in association with α, β, and ID received from the user 2 (step S258).

$$B \leftarrow \alpha \text{ XOR } An \qquad (39)$$

$$a \leftarrow \beta \text{ XOR } (B+K) \qquad (40)$$

Then, the server 3 determines whether a result of the unidirectional conversion of the calculated a and the stored ID, F(ID, a), is identical to $A_n$ (step S259). When F(ID, a) is identical to $A_n$ ("YES" at step S259), the server 3 authenticates the user 2. Subsequently, the server 3 decrypts the encrypted information γn using the received B (indicated as D_{B}(γn)), and determines whether D_{B}(γn) is identical to a (step S260).

When D_{B}(γn) is identical to a ("YES" at step S260), the server 3 verifies that the authentication information B is not modified, and starts a connection with the user 2 (step S261). In addition, the server 3 stores B as authentication information ($A_{n+1}$) that is used for the next ($(n+1)_{th}$) authentication process (step S262), and ends the process of the flowchart.

On the other hand, when F(ID, a) is not identical to $A_n$ ("NO" at step S259), the server 3 denies the authentication of the user 2, transmits an error message to the user 2 (step S263), and ends the process of the flowchart. Furthermore, when D_{B}(γn) is not identical to a ("NO" at step S260), the server 3 determines that the authentication information B is modified, transmits an error message to the user 2 (step S263), and ends the process of the flowchart.

As described above, according to the second embodiment, the authentication information for an authentication process can only be created using data (password S and random number $N_{n+1}$) that become sources of the authentication information that is exclusively stored in the apparatus to be authenticated (user 2). Therefore, even if information regarding the apparatus to be authenticated (ID, K, $A_n$, γn), which is stored in the authenticating apparatus (server 3) is stolen by a third party, the third party cannot create the authentication information for the authentication process, and cannot obtain an authentication by the authenticating apparatus.

Furthermore, by verifying whether data (a:D{B}(γn)) that becomes a source of the current authentication information that is used for the current authentication is calculated from information (γn:E{B}(a)) that is encrypted using the next authentication information (B), it is possible to detect a modification of delivering information by a third party.

According to a third embodiment of the present invention, data used for detecting a modification of delivering information is different from data used for an authentication process. With this mechanism, it is possible to enhance a security of the authentication process.

Figure 8:
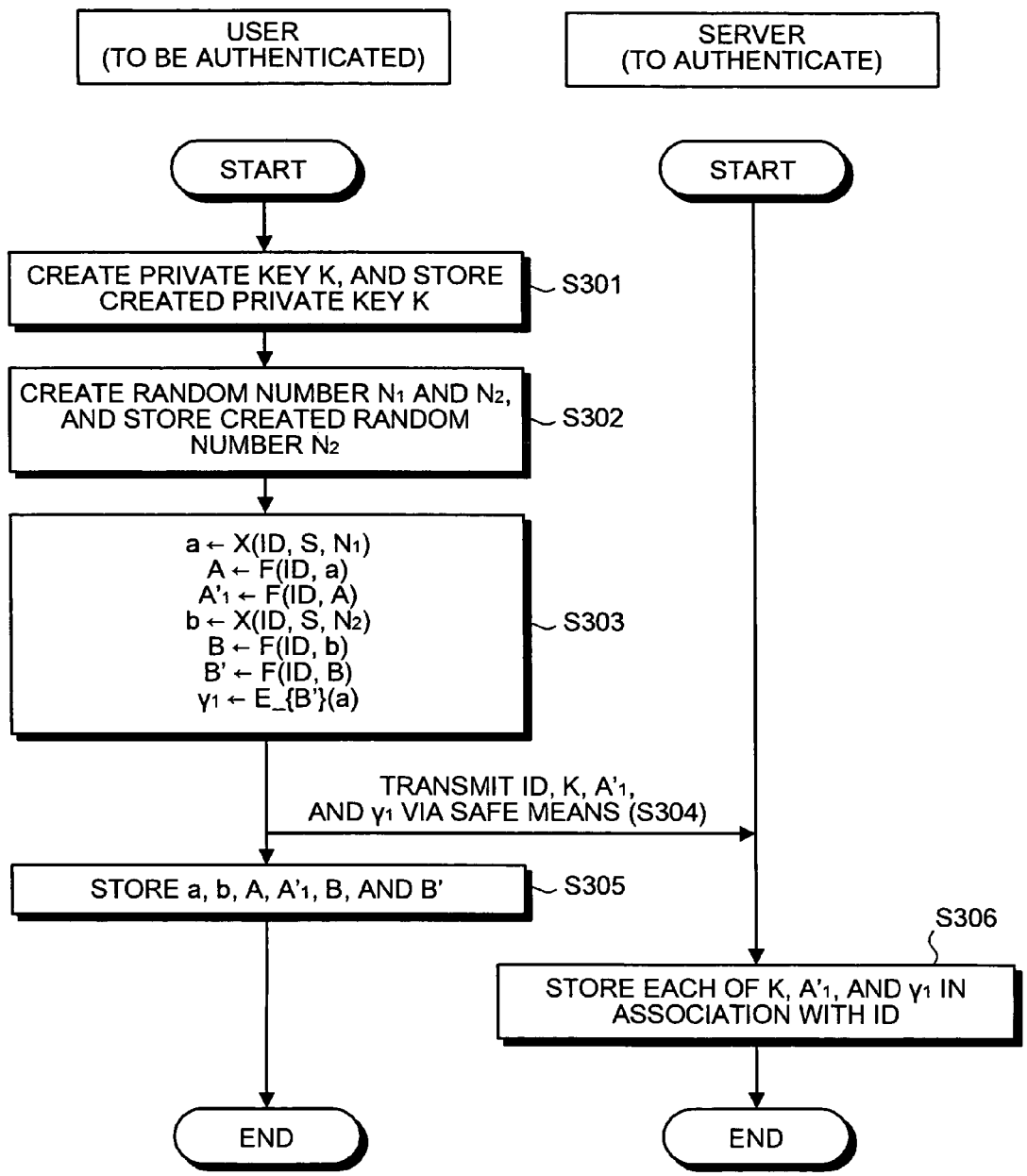
FIG. 8 is a flowchart of an initial registration of a user, according to a third embodiment of the present invention.

FIG. 8 is a flowchart of a processing procedure for an initial registration of a user, according to a third embodiment of the present invention. The user 2 possesses a user identifier ID for identifying itself from a plurality of users 2. In addition, the user 2 possesses a private password S that is known to itself only.

Firstly, the user 2 creates a private key K, and stores K (step S301). Then, the user 2 creates random numbers $N_1$ and $N_2$, and stores $N_2$ (step S302). The user 2 calculates A'1 from following Equations 41 to 43, and calculates γ1 from following Equations 44 to 47, using the user identifier ID, the password S, and the random number $N_1$ (step S303). The A'1 and γ1 are first-time authentication information that are used for a first time (n=1) authentication. The right-hand side of Equation 47 E_{B'}(a) is a value obtained by encrypting a by using B' as a key.

$$a \leftarrow X(\text{ID}, S, N_1) \qquad (41)$$

$$A \leftarrow F(\text{ID}, a) \qquad (42)$$

$$A'_1 \leftarrow F(\text{ID}, A) \qquad (43)$$

$$b \leftarrow X(\text{ID}, S, N_2) \qquad (44)$$

$$B \leftarrow F(\text{ID}, b) \qquad (45)$$

$$B' \leftarrow F(\text{ID}, B) \qquad (46)$$

$$\gamma_1 \leftarrow E\_\{B'\}(a) \qquad (47)$$

The user 2 transmits the user identifier ID, the private key K, and the first-time authentication information A'1 and γ1 via a safe means (step S304). Then, the user 2 stores the calculated a and b (hereinafter, "authenticator a and b"), A, $A'_1$, B, and B' (step S205), and ends the process of the flowchart.

The server 3 stores each of the private key K and the first-time authentication information A'1 and γ1 transmitted from the user 2 in association with the user identifier ID (step S306), and ends the process of the flowchart. With the above process, the user 2 is initially registered in the server 3.

Figure 9:
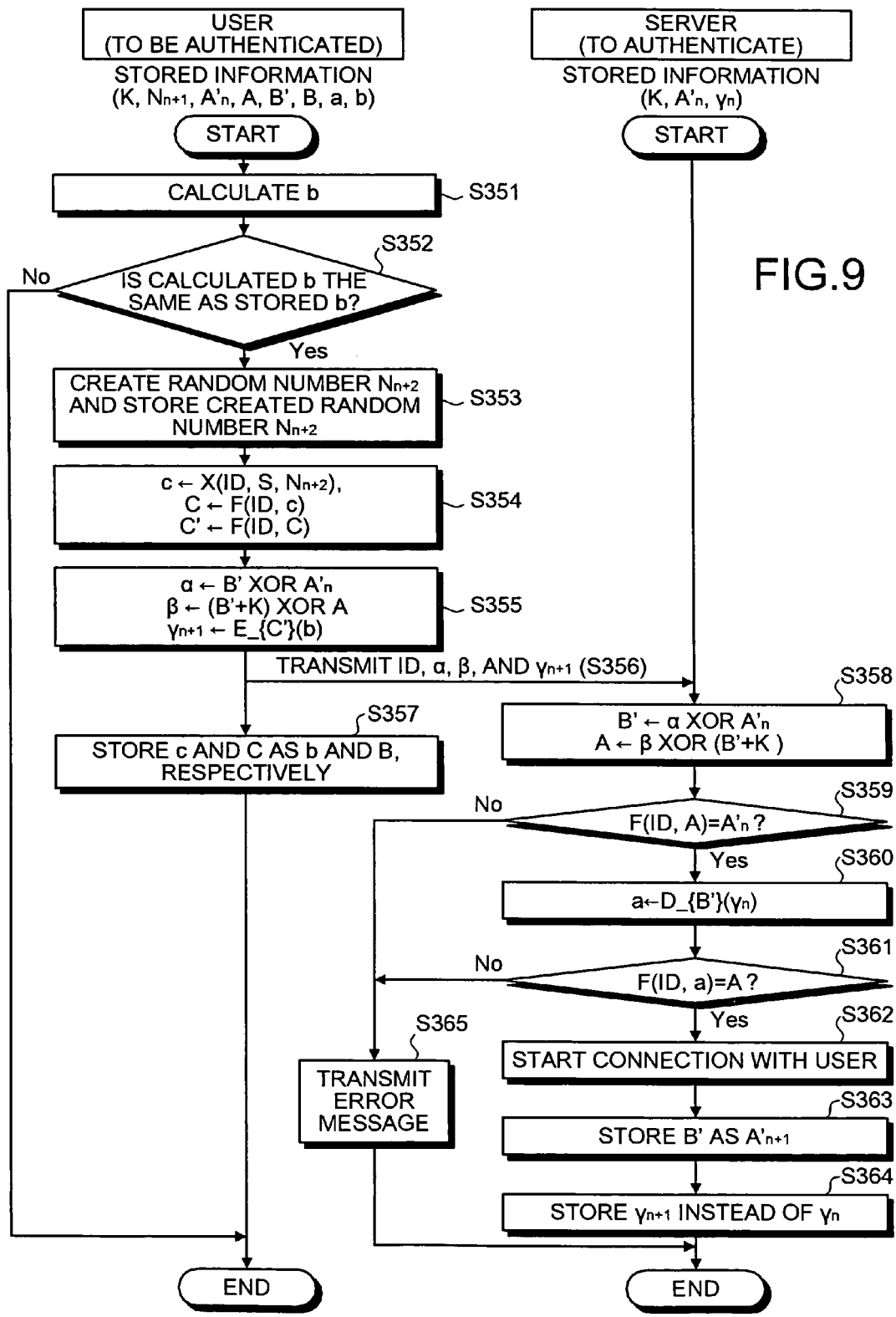
FIG. 9 is a flowchart of an $n_{th}$ time authentication after the first time (n=1) authentication, according to the third embodiment.
Figure 10:
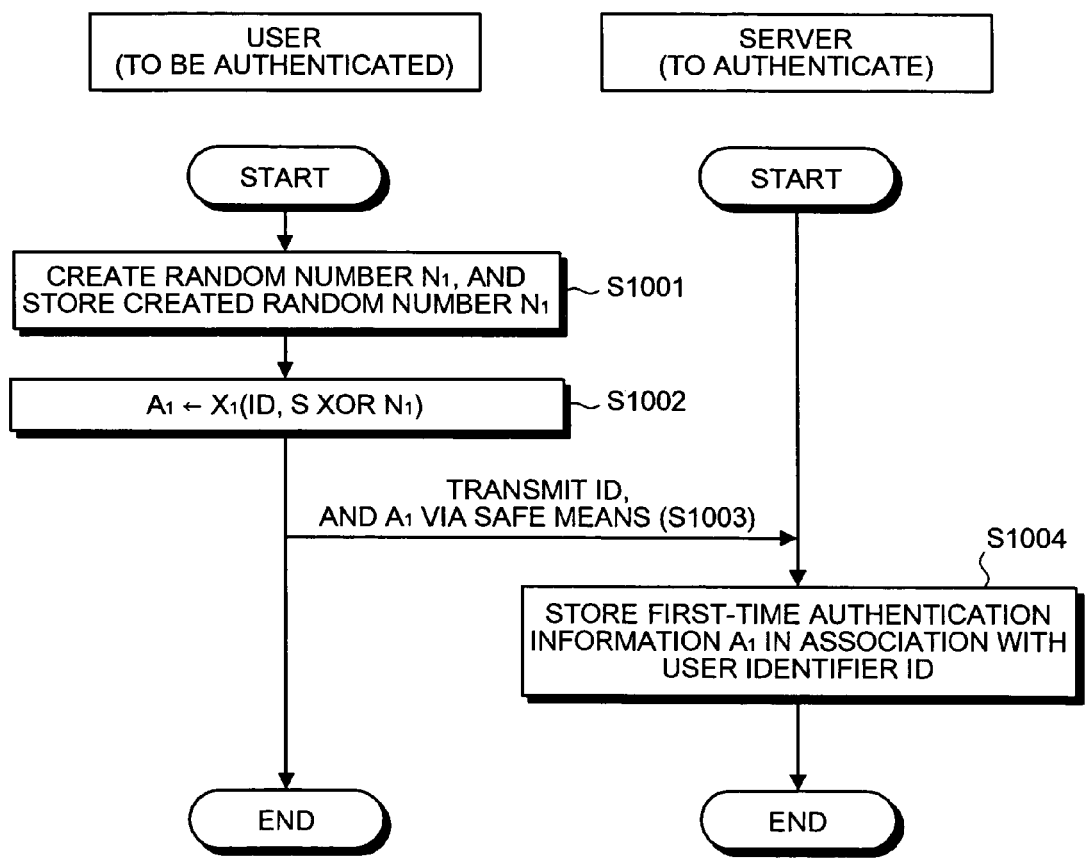
FIG. 10 is a flowchart of a user authentication in the SAS-2 authentication method.

FIG. 9 is a flowchart of a processing procedure for an $n_{th}$ time authentication after the first time (n=1) authentication, according to the third embodiment. At this moment, the user 2 possesses the private key K, the random number $N_{n+1}$ (at the time of the first time authentication, $N_2$ because n=1), the authentication information $A'_n$ (at the time of the first time authentication, n=1), A, B', B, and the authenticator a and b, as stored information. The server 3 possesses the private key K, and the authentication information $A'_n$ and $\gamma_n$ (at the time of the first time authentication, n=1) transmitted from the user 2 at the time of initial registration in FIG. 8, as stored information.

The user 2 calculates b defined by Equation 48 from stored $N_{n+1}$ (step S351), and determines whether the calculated b is identical to the stored b (step S352). At this time, ID and S that are used for calculating b can be requested to the user 2 for every authentication process, and can be stored in the user 2. When the calculated b is identical to the stored b ("YES" at step S352), the user 2 goes to step S353. On the other hand, when the calculated b is not identical to the stored b ("NO" at step S352), the user 2 ends the process of the flowchart.

$$b \leftarrow X(\text{ID}, S, N_{n+1}) \qquad (48)$$

The user 2 creates a new random number $N_{n+2}$, stores $N_{n+2}$ (step S353), and calculates C' from following Equations 49 to 51 (step S354).

$$c \leftarrow X(ID, S, N_{n+2}) \qquad (49)$$

$$C \leftarrow F(ID, c) \qquad (50)$$

$$C' \leftarrow F(ID, C) \qquad (51)$$

Subsequently, the user 2 calculates α, β, and γn+1 defined by following Equations 52 to 54, respectively, using the calculated b and C', and the stored K, $A_n$, A' and B' (step S355). Then, the user 2 transmits ID, α, β, and γn+1 to the server 3 (step S356). In addition, the user 2 stores the calculated c and C as the next authenticator b and the next authentication information B (step S357), and ends the process of the flowchart. As for the method of calculating α and β, although there are various methods as described in the first embodiment, operations shown in following Equations 52 and 53 are used as an example.

$$\alpha \leftarrow B' \text{ XOR } A'n \qquad (52)$$

$$\beta \leftarrow (B'+K) \text{ XOR } A \qquad (53)$$

$$\gamma_{n+1} \leftarrow E\_\{C'\}(b) \qquad (54)$$

The server 3 calculates A from following Equations 55 and 56 using the authentication information $A'_n$ and the private key K that are stored in association with α, β, and ID received from the user 2 (step S358).

$$B' \leftarrow \alpha \text{ XOR } A'n \qquad (55)$$

$$A' \leftarrow \beta \text{ XOR } (B'+K) \qquad (56)$$

Then, the server 3 determines whether a result of the unidirectional conversion of the calculated A and the stored ID, F(ID, A), is identical to $A'_n$ (step S359). When F(ID, A) is identical to A'n ("YES" at step S359), the server 3 authenticates the user 2. Subsequently, the server 3 decrypts the encrypted information γn using the received B' (indicated as $D\_\{B'\}(\gamma n)$), and calculates a defined by following Equation 57 (step S360).

$$a \leftarrow D\_\{B'_n\}(\gamma n) \qquad (57)$$

The server 3 determines whether a result of the unidirectional conversion of the calculated a and ID, F(ID, a), is identical to A (step S361). When F(ID, a) is identical to A ("YES" step S361), the server 3 verifies that the authentication information B' is not modified, and starts a connection with the user 2 (step S362).

In addition, the server 3 stores B' as authentication information ($A'_{n+1}$) that is used for the next ($(n+1)_{th}$) authentication process (step S363). The server 3 stores $\gamma n_{+1}$ that is transmitted from the user 2 at step S356 as the authentication information for the next ($(n+1)_{th}$) authentication process instead of γn (step S364), and ends the process of the flowchart.

On the other hand, when F(ID, A) is not identical to $A'_n$ ("NO" at step S359), the server 3 denies the authentication of the user 2, transmits an error message to the user 2 (step S365), and ends the process of the flowchart. Furthermore, when F(ID, a) is not identical to A ("NO" at step S361), the server 3 determines that the authentication information B is modified, transmits an error message to the user 2 (step S365), and ends the process of the flowchart.

As described above, according to the third embodiment, the authentication information for an authentication process can only be created using data (password S and random number $N_{n+1}$) that become sources of the authentication information that is exclusively stored in the apparatus to be authenticated (user 2). Therefore, even if information regarding the apparatus to be authenticated (ID, K, A', γn), which is stored in the authenticating apparatus (server 3) is stolen by a third party, the third party cannot create the authentication information for the authentication process, and cannot obtain an authentication by the authenticating apparatus.

Furthermore, by verifying whether data (a:D{B'}(γn)) that becomes a source of the current authentication information that is used for the current authentication is calculated from information (γn:E{B'}(a)) that is encrypted using the next authentication information (B'), it is possible to detect a modification of delivering information by a third party.

In addition, by using different data (A') used for the authentication from data (A) used for detecting a modification of delivering information, it is possible to enhance a security of the authentication process.

As described above, in the authentication processing method, the authentication processing program, the recording medium, and the authentication processing apparatus according to the present invention, the data used for the authentication process is transmitted and received in a mask-processed state. Therefore, it is possible to prevent a leakage of data used for the authentication process to a third party. In addition, by verifying whether data obtained by applying a unidirectional conversion on data a that becomes a source of the current authentication information is identical to the current authentication information A, it is possible to authenticate a qualification of an apparatus to be authenticated.

Furthermore, in the authentication processing method, the authentication processing program, the recording medium, and the authentication processing apparatus according to the present invention, in addition to a verification of relation of information delivered to an authenticating apparatus, a verification whether data obtained by applying a unidirectional conversion on data a that becomes a source of the current authentication information is identical to the current authentication information A is performed. With this mechanism, it is possible to detect whether the delivering information is created by a legal apparatus to be authenticated. Therefore, even if the current authentication information A that is registered in the authenticating apparatus is stolen by a third party, it is possible to prevent an illegal authentication by others.

The authentication processing method according to the present invention can be realized by executing a program prepared in advance with a computer, such as a personal computer and a workstation. The program is stored in a computer-readable recording medium, such as a hard disk (HD), a flexible disk (FD), a compact disk-read only memory (CD-ROM), a magneto-optic (MO) disk, and a digital versatile disk (DVD). The computer reads out the program from the recording medium, and executes it. Furthermore, the program can be distributed via a network, such as the Internet.

According to the embodiments described above, it is possible to enhance security.

The present document incorporates by reference the entire contents of Japanese priority document, 2005-246506 filed in Japan on Aug. 26, 2005.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of authenticating a subject device to be authenticated, comprising:
    acquiring current authentication information that is created using an arbitrary value, and that is used for a current authentication process, from the subject device;
    acquiring encryption information that is the arbitrary value encrypted using next authentication information as an encryption key, from the subject device;
    receiving first transmission information that is expressed as the next authentication information exclusive-OR the current authentication information, the next authentication information being used for a next authentication process, and second transmission information in which the arbitrary value is hidden using the next authentication information, from the subject device;
    calculating the next authentication information based on the first transmission information and the current authentication information;
    calculating the arbitrary value based on calculated next authentication information and the second transmission information; and
    determining whether to authenticate the subject device based on a calculated arbitrary value and the current authentication information,
    wherein the acquiring includes acquiring the current authentication information that is created by performing, two times, an operation using a one-way function on the arbitrary value, and
    wherein the determining includes
        decrypting the encryption information using the next authentication information;
        determining whether to authenticate the subject device based on decrypted encryption information;
        performing, two times, the operation using the one-way function on the calculated arbitrary value; and
        determining whether to authenticate the subject device based on whether a value obtained by performing, two times, the operation using the one-way function on the calculated arbitrary value is identical to the current authentication information.

2. The method according to claim 1, wherein
the acquiring includes acquiring the current authentication information that is created by performing an operation using a one-way function on an arbitrary value, and
the determining includes
    performing the operation using the one-way function on the calculated arbitrary value; and
    determining whether a value obtained by performing the operation using the one-way function on the calculated arbitrary value is identical to the current authentication information.

3. The method according to claim 1, wherein
the receiving includes receiving a value obtained by performing an operation using a mask function on the next authentication information and the current authentication information, as the first transmission information, and a value obtained by performing the operation using the mask function on the arbitrary value and the next authentication information, as the second transmission information,
the calculating the next authentication information includes calculating the next authentication information by performing the operation using the mask function on the first transmission information and the current authentication information, and
the calculating the arbitrary value includes calculating the arbitrary value by performing the operation using the mask function on the calculated next authentication information and the second transmission information.

4. The method according to claim 1, further comprising
acquiring an authentication key from the subject device, wherein the authentication key is unique to the subject device, wherein
the receiving includes receiving a value in which the arbitrary value is hidden by a value obtained by performing an operation using the authentication key on the next authentication information as the second transmission information, and
the calculating the arbitrary value includes calculating the arbitrary value based on the authentication key, the calculated next authentication information, and the second transmission information.

5. The method according to claim 1, further comprising
acquiring an authentication key from the subject device, wherein the authentication key is unique to the subject device, wherein
the receiving includes receiving a value in which a value obtained by performing an operation using the authentication key on the next authentication information is hidden using the current authentication information, as the first transmission information, and
the calculating the next authentication information includes calculating the next authentication information based on the authentication key, the first transmission information, and the current authentication information.

6. A method of requesting an authentication to an authenticating apparatus from a subject device to be authenticated, comprising:
    creating current authentication information that is used for a current authentication process, using an arbitrary value;
    acquiring encryption information that is the arbitrary value encrypted using next authentication information as an encryption key, from the subject device;
    delivering the current authentication information and the encryption information to the authenticating apparatus;
    creating first transmission information that is expressed as the next authentication information exclusive-OR the current authentication information, the next authentication information being used for a next authentication process;
    creating second transmission information in which the arbitrary value is hidden using the next authentication information;
    transmitting the first transmission information and the second transmission information to the authenticating apparatus,
    wherein the creating current authentication information includes creating the current authentication information by performing, two times, an operation using a one-way function on the arbitrary value.

7. The method according to claim 6, wherein
the creating current authentication information includes creating the current authentication information by performing an operation using a one-way function.

8. The method according to claim 6, wherein
the creating the first transmission information includes performing an operation using a mask function on the next authentication information and the current authentication information, and
the creating the second transmission information includes creating the second transmission information by performing the operation using the mask function on the arbitrary value and the next authentication information.

9. The method according to claim 6, further comprising:
creating an authentication key that is unique to a subject device to be authenticated; and
delivering the authentication key to the authenticating apparatus, wherein
the creating second transmission information includes
performing an operation using the authentication key on the next authentication information; and
creating the second transmission information in which the arbitrary value is hidden by a value obtained by performing the operation using the authentication key on the next authentication information.

10. The method according to claim 6, further comprising:
creating an authentication key that is unique to a subject device to be authenticated; and
delivering the authentication key to the authenticating apparatus, wherein
the creating the first transmission information includes
performing an operation using the authentication key on the next authentication information; and
creating the first authentication information in which a value obtained by performing the operation using the authentication key is hidden using the current authentication information.

11. A non-transitory computer-readable recording medium that stores therein a computer program for authenticating a subject device to be authenticated, the computer program making a computer execute:
acquiring current authentication information that is created using an arbitrary value, and that is used for a current authentication process, from the subject device;
acquiring encryption information that is the arbitrary value encrypted using next authentication information as an encryption key, from the subject device;
receiving first transmission information that is expressed as the next authentication information exclusive-OR the current authentication information, the next authentication information being used for a next authentication process, and second transmission information in which the arbitrary value is hidden using the next authentication information, from the subject device;
calculating the next authentication information based on the first transmission information and the current authentication information;
calculating the arbitrary value based on calculated next authentication information and the second transmission information; and
determining whether to authenticate the subject device based on a calculated arbitrary value and the current authentication information,
wherein the acquiring includes acquiring the current authentication information that is created by performing, two times, an operation using a one-way function on the arbitrary value, and
wherein the determining includes
decrypting the encryption information using the next authentication information;
determining whether to authenticate the subject device based on decrypted encryption information: and
performing, two times, the operation using the one-way function on the calculated arbitrary value; and
determining whether to authenticate the subject device based on whether a value obtained by performing, two times, the operation using the one-way function on the calculated arbitrary value is identical to the current authentication information.

12. A non-transitory computer-readable recording medium that stores therein a computer program for requesting an authentication to an authenticating apparatus from a subject device to be authenticated, the computer program making a computer execute:
creating current authentication information that is used for a current authentication process, using an arbitrary value;
acquiring encryption information that is the arbitrary value encrypted using next authentication information as an encryption key, from the subject device;
delivering the current authentication information and the encryption information to the authenticating apparatus;
creating first transmission information that is expressed as next authentication information exclusive-OR the current authentication information, the next authentication information being used for a next authentication process;
creating second transmission information in which the arbitrary value is hidden using the next authentication information; and
transmitting the first transmission information and the second transmission information to the authenticating apparatus,
wherein the creating current authentication information includes creating the current authentication information by performing, two times, an operation using a one-way function on the arbitrary value.

13. An authentication apparatus comprising:
a first acquiring unit configured to acquire, from a subject device to be authenticated, current authentication information that is created using an arbitrary value and that is used for a current authentication process, and encryption information that is the arbitrary value encrypted using next authentication information as an encryption key, from the subject device;
a receiving unit configured to receive, via a network interface, first transmission information that is expressed as next authentication information exclusive-OR the current authentication information, the next authentication information being used for a next authentication, and second transmission information in which the arbitrary value is hidden using the next authentication information, from the subject device;
a first calculating unit configured to calculate the next authentication information based on the first transmission information and the current authentication information;
a second calculating unit configured to calculate the arbitrary value based on calculated next authentication information and the second transmission information; and
a determining unit configured to determine whether to authenticate the subject device based on a calculated arbitrary value and the current authentication information,
wherein the acquiring includes acquiring the current authentication information that is created by performing, two times, an operation using a one-way function on the arbitrary value, and
wherein the determining includes
decrypting the encryption information using the next authentication information;
determining whether to authenticate the subject device based on decrypted encryption information; and performing, two times, the operation using the one-way function on the calculated arbitrary value; and determining whether to authenticate the subject device based on whether a value obtained by performing, two times, the operation using the one-way function on the calculated arbitrary value is identical to the current authentication information.

14. An authentication apparatus comprising:

a creating unit configured to:

- create current authentication information that is used for a current authentication process, using an arbitrary value;
- create first transmission information that is expressed as next authentication information exclusive-OR the current authentication information, the next authentication information being used for a next authentication process;
- create second transmission information in which the arbitrary value is hidden using the next authentication information; and
- acquire encryption information that is the arbitrary value encrypted using the next authentication information as an encryption key;

a delivering unit configured to deliver the current authentication information and the encryption information to an authenticating apparatus that authenticates the authentication apparatus; and a transmitting unit configured to transmit, via a network interface, the first transmission information and the second transmission information to the authenticating apparatus, wherein the creating current authentication information includes creating the current authentication information by performing, two times, an operation using a one-way function on the arbitrary value.

* * * * *